US010176454B2

(12) United States Patent
Jones et al.

(10) Patent No.: US 10,176,454 B2
(45) Date of Patent: Jan. 8, 2019

(54) AUTOMATED SHELF SENSING SYSTEM

(71) Applicant: Walmart Apollo, LLC, Bentonville, AR (US)

(72) Inventors: Nicholaus Adam Jones, Fayetteville, AR (US); Aaron Vasgaard, Fayetteville, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/883,362

(22) Filed: Jan. 30, 2018

(65) Prior Publication Data
US 2018/0240063 A1 Aug. 23, 2018

Related U.S. Application Data

(60) Provisional application No. 62/462,601, filed on Feb. 23, 2017.

(51) Int. Cl.
*G06Q 10/08* (2012.01)
*G06F 17/30* (2006.01)
*G06F 1/32* (2006.01)
*G06F 1/16* (2006.01)

(52) U.S. Cl.
CPC ......... *G06Q 10/087* (2013.01); *G06F 1/1632* (2013.01); *G06F 1/3203* (2013.01); *G06F 17/30002* (2013.01); *G06F 17/30557* (2013.01)

(58) Field of Classification Search
CPC .... G06Q 10/87; G06Q 20/203; G06F 1/1632; G06F 1/3203; G06F 17/30002; G06F 17/30557; A47B 87/0207; A47B 47/03

USPC .................................................... 705/22, 28
See application file for complete search history.

(56) References Cited

U.S. PATENT DOCUMENTS

| 7,766,242 | B2 | 8/2010 | Lunak et al. |
| 7,792,711 | B2 | 9/2010 | Swafford, Jr. et al. |
| 8,260,456 | B2 | 9/2012 | Siegel et al. |
| 8,864,362 | B2 | 10/2014 | Sherman et al. |
| 9,024,755 | B2 | 5/2015 | Fuhr et al. |
| 9,275,361 | B2 | 3/2016 | Meyer |
| 2008/0068173 | A1 | 3/2008 | Alexis et al. |
| 2013/0304959 | A1 | 11/2013 | Chiang |
| 2015/0029339 | A1 | 1/2015 | Kobres et al. |
| 2015/0300887 | A1 | 10/2015 | Mandava et al. |

FOREIGN PATENT DOCUMENTS

EP 1741074 B1 1/2007

OTHER PUBLICATIONS

International Search Report and Written Opinion from related International Patent Application No. PCT/US2018/015886 dated Apr. 12, 2018.

*Primary Examiner* — Kristie A Mahone
(74) *Attorney, Agent, or Firm* — McCarter & English, LLP; David R. Burns

(57) ABSTRACT

Systems and methods for powering sensors on a shelf and using the sensors to detect attributes associated with physical objects are discussed. A handheld device can be coupled to a docking station which can be mounted on a supporting surface on of a shelf for supporting one or more physical objects. Sensors can be disposed on, in or about the supporting surface of the shelf. An electric circuit between the handheld device and the sensors can be powered to selectively energize or de-energize the sensors in response to the docking station coupling with the handheld device.

24 Claims, 7 Drawing Sheets

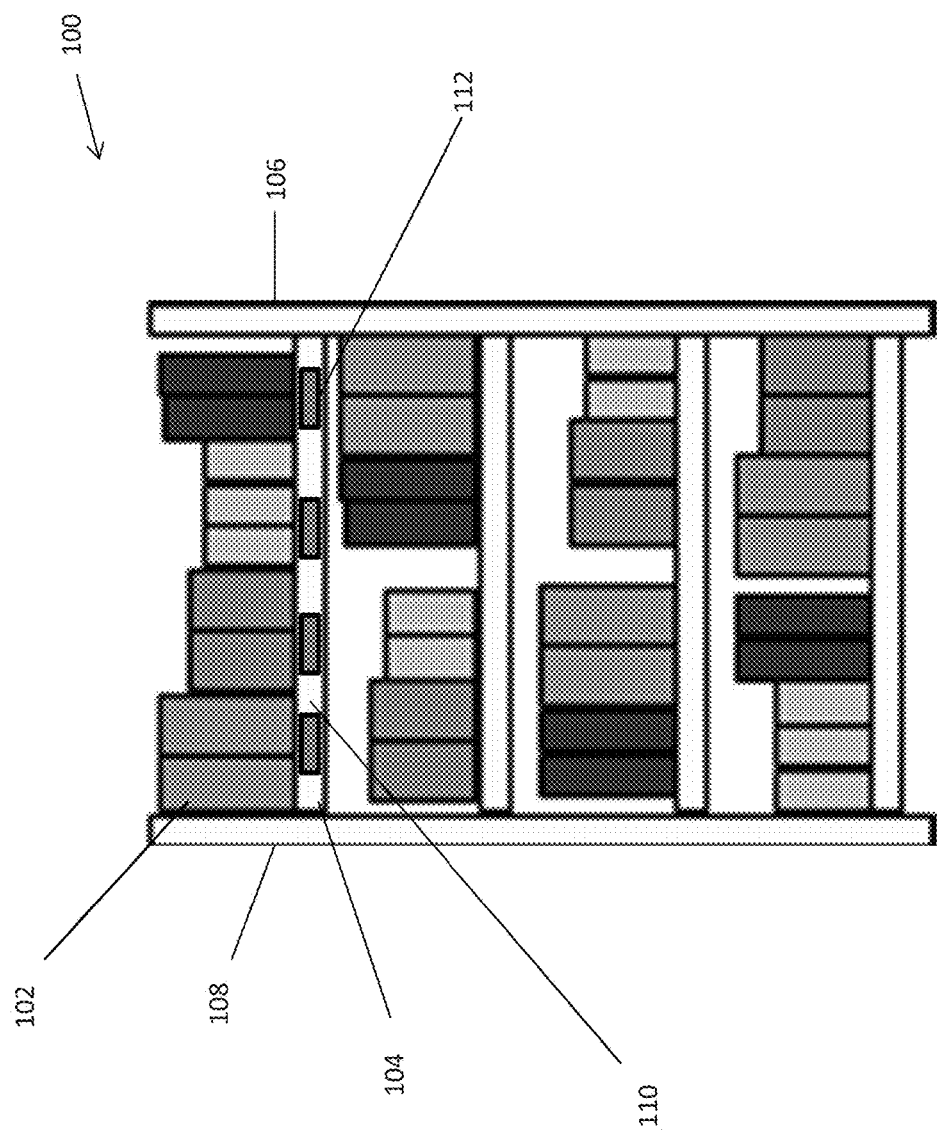

AUTOMATED SHELF SENSING SYSTEM

CROSS-REFERENCE TO RELATED PATENT APPLICATIONS

This application claims priority to U.S. Provisional Application No. 62/462,601 filed on Feb. 23, 2017, the content of which is hereby incorporated by reference in its entirety.

BACKGROUND

Sensors may be used to detect a variety of attributes of physical objects such as weight and moisture. Sensors may be formed of a piezoelectric material, which can measure various characteristics, including, for example, pressure, force, and temperature.

SUMMARY

In one embodiment, an automated sensing system includes a shelf including a supporting surface for supporting one or more physical objects and multiple sensors disposed on, in or about the supporting surface of the shelf. The sensors are configured to detect one or more attributes associated with the one or more physical objects. The system further includes a docking station disposed in or about the supporting surface of the shelf and electrically coupled to the sensors. The docking station is configured to couple to a handheld device. The system further includes a controller configured to power an electric circuit between the handheld device and the sensors to selectively energize or de-energize the sensors in response to coupling the handheld device within the docking station.

In one embodiment, an automated sensing method includes providing a shelf including a supporting surface for supporting one or more physical objects, a docking station and multiple sensors disposed on, in or about the supporting surface of the shelf. The docking station is electrically coupled to the sensors. The method further includes, coupling the handheld device, with the docking station, to power an electrical circuit between the handheld device and the sensors to selectively energize or de-energize the sensors in response to the docking station coupling with the handheld device. The method also includes detecting, via the sensors, one or more attributes associated with one or more physical objects disposed on the supporting surface of the shelf.

In one embodiment, an automated sensing system includes a handheld device that includes a display and is configured to execute a sensing application, a shelf including a supporting surface for supporting one or more physical objects and multiple sensors disposed on, in or about the supporting surface of the shelf. The sensors are configured to detect one or more attributes associated with the one or more physical objects, encode data associated with the one or more attributes into communication signals and transmit the communication signals. A docking station is disposed in or about the supporting surface of the shelf and electrically coupled to the sensors. The docking station is configured to couple to the handheld device. An electric circuit between the handheld device and the plurality of sensors is powered in response to coupling the handheld device within the docking station. The electric circuit selectively energizes or de-energizes the sensors. The system further includes a computing system including a database that is communicatively coupled to the sensors and the handheld device. The computing system is configured to receive the communication signals from the sensors; decode the data associated with the one or more attributes from the communication signals, and to transmit instructions associated with the one or more physical objects to the sensing application on the handheld device.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the invention and, together with the description, help to explain the invention. In the figures:

FIG. 1A is a block diagram of an exemplary storage unit according to an exemplary embodiment;

DETAILED DESCRIPTION

Figure 1B:
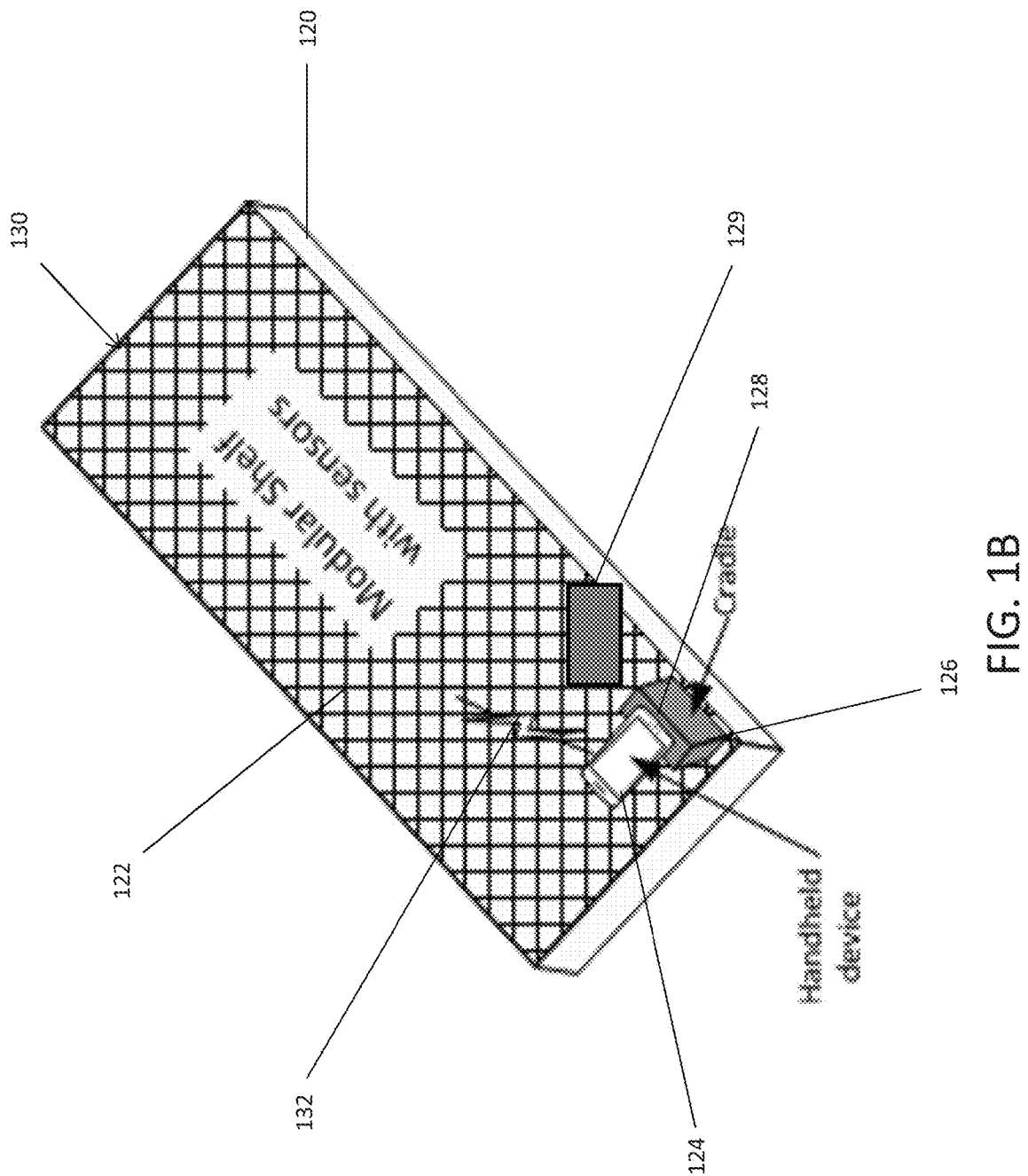
FIG. 1B is a block diagram of a shelving structure including sensors and a docking station according to an exemplary embodiment.

Described in detail herein are systems and methods for powering sensors disposed on a shelf and using the sensors for detecting attributes associated with physical objects disposed on the shelf. A handheld device can be coupled to a docking station which can be mounted on a supporting surface on a shelf for supporting one or more physical objects. Sensors can be disposed on the supporting surface of the shelf. An electric circuit between the handheld device and the sensors can be powered to selectively energize or de-energize the sensors in response to the docking station coupling with the handheld device. The sensors can detect one or more attributes associated with one or more physical objects disposed on the supporting surface of the shelf.

FIG. 1A is a block diagram of an exemplary storage unit according to an exemplary embodiment. The storage unit 100 can include several shelves 104 and physical objects 102 can be disposed on top of the shelving structures. The shelves 104 can be configured to support and store the physical objects 102. The shelves 104 can include a top or supporting surface extending the length of the shelf 104. Sensors (not shown in FIG. 1A) can be disposed on the supporting surface of the shelf 104 and can be configured to detect attributes associated with the physical objects 102. In one embodiment, the supporting structure for maintaining the shelves 104 substantially parallel to horizontal can include vertical supports 106 and 108. The shelves 104 can also include a front face 110. Labels 112, including machine-readable elements, can be disposed on the front face 110 of the shelves 104. The machine-readable elements can be encoded with identifiers associated with the physical objects disposed on the shelves 104.

FIG. 1B is a block diagram of a shelving structure including sensors and a docking station according to an exemplary embodiment. As mentioned above sensors 122 can be disposed on the supporting surface 130 of the shelf 120. The sensors 122 can be piezoelectric sensors configured to detect attributes associated with the physical objects disposed on the supporting surface 130 of the shelf 120. A docking station 126 can also be disposed on the shelf. The docking station 126 may be mounted to the supporting surface 130 of the shelf 120. The docking station 126 can be mounted anywhere on the supporting surface 130 of the shelf 120. The docking station 126 can include an electrical connector (not shown). A handheld device 124 can be configured to be docked within the docking station 126. The handheld device 124 can be, without limitation, a mobile phone, a portable digital assistant, a laptop computer, a tablet device, or a wireless portable device. The handheld device 124 can also include an electrical connector 128 and the electrical connector 128 of the handheld device 124 can be configured to be mechanically couple with the electrical connector 128 of the docking station 126. In one embodiment, the electric connector 128 of the handheld device 124 can be a female connector and the electric connector of the docking station 126 can be a male connector. Alternatively, the electric connector 128 of the handheld device 124 can be a male connector and the electric connector of the docking station 126 can be a female connector. In response to the electrical connector 128 of the handheld device 124 and the electrical connector of the docking station mechanically coupling, a controller 129 can power an electric circuit 132 between the handheld device 124 and the sensors 122 to selectively energize or de-energize the sensors 122 using power supplied from the handheld device. For example, in one embodiment, the controller 129 may be an addressable hardware switch that is part of the docking station 126 or shelf 120 that enables power to be selectively provided to a portion of the sensors on the supporting surface 130 of the shelf 120 in response to a command generated from executing instructions on the handheld device. Alternatively, all of the sensors on the supporting surface 120 of the shelf can be energized by virtue of the handheld device completing and providing power to an electrical circuit but may be individually addressable by a software controller in the handheld device which instructs only a subset of the sensors to collect data.

In one embodiment, the handheld device 124 may include a power source such as, but not limited to, a rechargeable battery. Docking the handheld device 124 within the docking station 126 and completing the electric circuit 132 allows the handheld device 124 to provide electrical power to the sensors 122 through the docking station 126. Accordingly, rather than implementing a separate power source incorporated into the shelf 120 or connected to the shelf for energizing the sensors 122, the handheld device 124 can be used as the single source of electrical power to the sensors 122.

In response to being selectively energized the sensors 122 can detect attributes associated with the physical objects disposed on the sensors 122. The sensors 122 can encode data indicative of the attributes into communication signals and the sensors 122 can transmit the communication signals to a computing system. Exemplary attributes can be, but are not limited to, quantity, weight, temperature, size, shape, color, object type, and moisture.

Figure 1C:
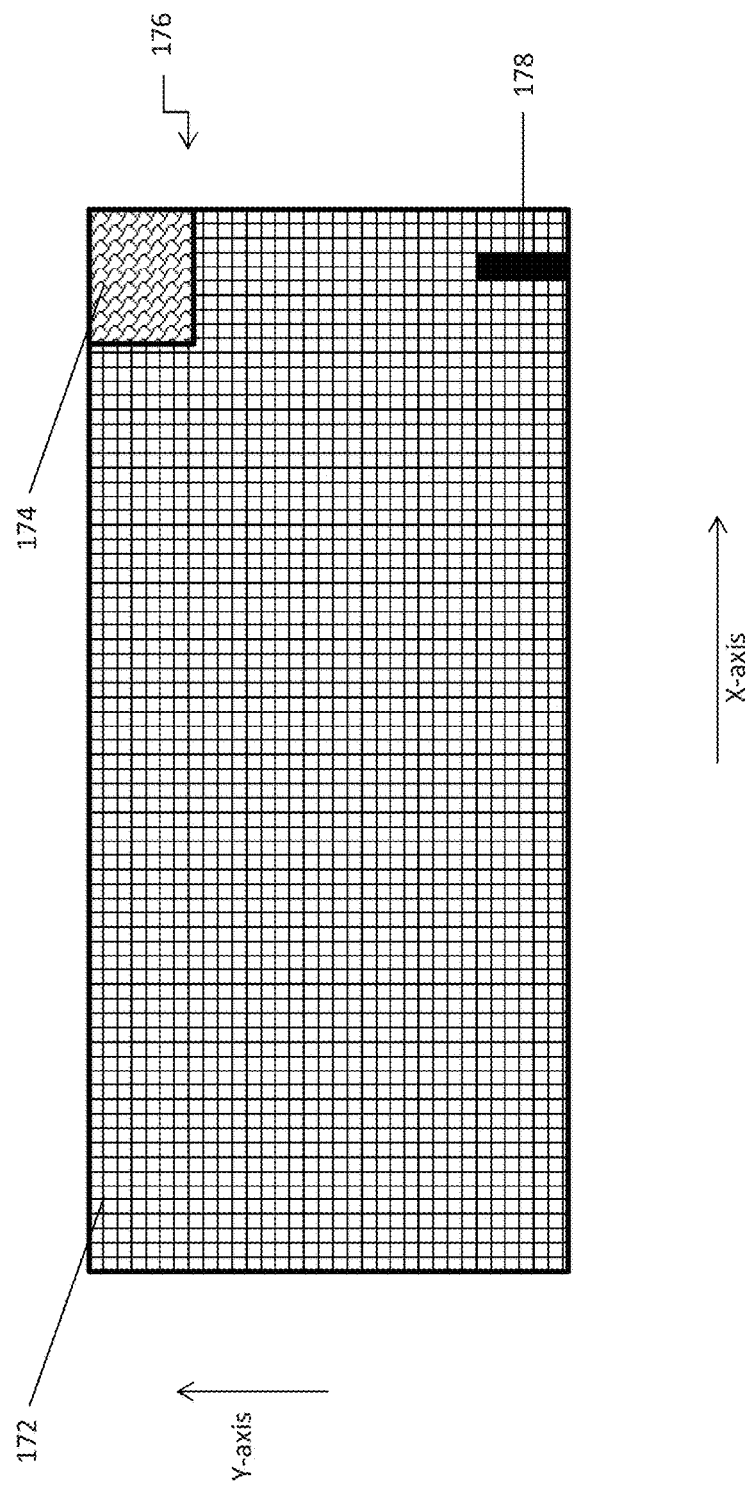
FIG. 1C illustrates an array of sensors in accordance with an exemplary embodiment.

FIG. 1C illustrates an array of sensors 176 in accordance with an exemplary embodiment. The array of sensors 176 can be disposed at on the supporting surfaces (e.g. supporting surface 130 as shown in FIG. 1B) of the shelves (e.g. shelves 104, 120 as shown in FIG. 1A-B) included on the storage units (e.g., embodiments of the storage unit 100 shown in FIG. 1A). The array of sensors 176 may be arranged as multiple individual sensor strips 172 extending along the shelves, defining a sensing grid or matrix. The array of sensors 176 can be built into the shelves itself or may be incorporated into a liner or mat disposed at the supporting surfaces of the shelves. Although the array of sensors 176 is shown as arranged to form a grid, the array of sensors can be disposed in other various ways. For example, the array of sensors 176 may also be in the form of lengthy rectangular sensor strips extending along either the x-axis or y-axis. The array of sensors 176 can detect attributes associated with the physical objects that are stored on the supporting surfaces of the shelves, such as, for example, detecting pressure or weight indicating the presence or absence of physical objects at each individual sensor 172. Alternatively, the sensors may detect other attributes such as temperature or moisture associated with a physical object. In one embodiment, the supporting surface of the shelves is covered with an appropriate array of sensors 176 with sufficient discrimination and resolution so that, in combination, the sensors 172 are able to identify the quantity, and in some cases, the type of physical objects on the shelves.

The array of sensors 176 may be formed of a piezoelectric material, which can measure various characteristics, including, for example, pressure, force, and temperature. While piezoelectric sensors are one suitable sensor type for implementing at least some of the sensor at the shelves, exemplary embodiments can implement other sensor types for determine attributes of physical objects including, for example, other types of pressure/weight sensors (load cells, strain gauges, etc.).

It should be appreciated that in other embodiments, the sensors may be located in a position other than on the supporting surface of the shelf. For example, in one embodiment, the sensors may be embedded in the shelf. In another embodiment the sensors may be located immediately adjacent to the shelf. In one embodiment, the sensors may instead be located in the proximity of the shelf so that the shelf is within sensor range of the particular type of sensor. Further, in an embodiment, a mixture of sensor locations may be used.

Figure 2:
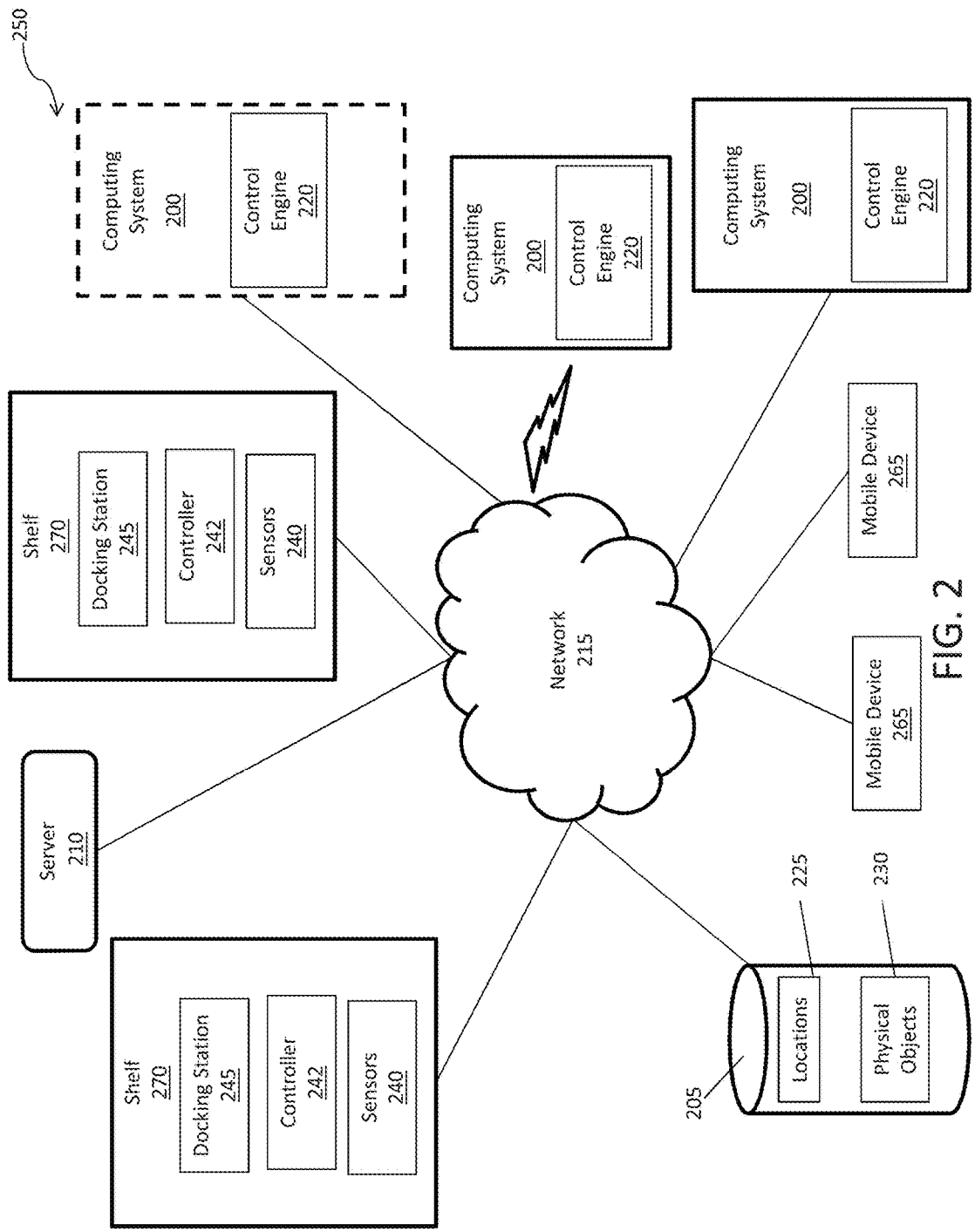
FIG. 2 illustrates an exemplary automated shelf sensing system in accordance with an exemplary embodiment.

FIG. 2 illustrates an exemplary automated shelf sensing system in accordance with exemplary embodiments of the present disclosure. The automated shelf sensing system 250 can include one or more databases 205, one or more servers 210, one or more computing systems 200, sensors 240 and handheld devices 265. In exemplary embodiments, the computing system 200 is in communication with one or more of the databases 205, a server 210, the sensors 240 and the handheld devices 265, via a communications network 215. The sensors 240 can be disposed on, in, adjacent to, or in the proximity of, the shelves and can detect attributes associated with physical objects disposed on the supporting surfaces of the shelves. The computing system can execute one or more instances of the control engine 220.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 200 includes one or more computers or processors configured to communicate with the databases 205, sensors 240 and handheld devices 265 via the network 215. The computing system 200 hosts one or more applications configured to interact with one or more components of the automated shelf sensing system 250. The databases 205 may store information/data, as described herein. For example, the databases 205 can include a locations database 225, physical objects database 230. The locations database 225 can store location information associated with physical objects disposed in a facility. The physical objects database 230 can store information associated with physical objects. The databases 205 and server 210 can be located at one or more geographically distributed locations from each other or from the computing system 200. Alternatively, the databases 205 can be included within server 210 or computing system 200.

In one embodiment, a handheld device 265 can be mechanically coupled with a docking station 245 mounted on a shelf 270. In response to the handheld device 265 and the docking station being mechanically coupled, a controller 242 can power an electric circuit between the handheld device 265 and the sensors 240 to selectively energize or de-energize the sensors 240 disposed on the shelf. The powering and activation of the sensors can take place in a number of different ways. In one embodiment, the docking of the handheld device 265 with the docking station completes an electrical circuit between the docking station and the sensors and a power source in the handheld device provides power sufficient to power the sensors. In another embodiment, the circuit is completed but a separate power source connected to the electric circuit is utilized to provide power. A controller 242 controls which sensors 240 are activated to acquire data for the system. In an embodiment, the controller 242 is an addressable hardware switch that is in communication with the handheld device or a computing system and receives instructions to interrupt the powered electric circuit for certain sensors so that the sensors are deactivated. In another embodiment, all of the sensors 240 are powered but a software controller in the handheld device utilizes the communication capability in the handheld device to communicate instructions directly to the sensors to activate or deactivate their data acquisition. It will be appreciated that the instructions may be transmitted wirelessly.

In response to receiving power the sensors 240 can detect a set of attributes associated with the physical object disposed on the shelf. The sensors 240 can encode data indicative of the attributes into communication signals and transmit the communication signals to the computing system 200. The computing system 200 can execute the control engine 220 in response to receiving the communication signals from the sensors 240. The communication signals 240 can also include the location of the sensors 240. The control engine 220 can decode the communication signals to extract the data indicative of the attributes and location of the sensors 240. The control engine 220 can query the locations database 225 using the location of the sensors 240 to determine the physical objects disposed at the location of the sensors 240. The control engine 220 can query the physical objects database using the determined physical objects at the locations of the sensors 240 to retrieve information associated with the physical objects. The control engine 220 can compare the set of attributes detected by the sensors 240 and the retrieved set of information associated with the physical objects. The control engine 220 can trigger an action based on the comparison. In some embodiments, the action can be updating the database and/or transmitting an alert. The control engine 220 can transmit an alert to the handheld device 265 docked at the docking station where the alert can be displayed on a display surface to a user. Alternatively, the control engine 220 can transmit an alert to another handheld device.

In some embodiments, the control engine 220 can instruct the handheld device 265 to de-energize or deactivate a portion of the sensors 240 disposed on the shelf. Alternatively, the control engine 220 can instruct the handheld device 265 to de-energize or deactivate all of the sensors 240 disposed on the shelf. The control engine 220 can determine based on records in the physical objects database 230 that a quantity of a group of like physical objects is below a specified threshold amount. The control engine 220 can instruct the handheld device 265 to energize the only sensors 240 disposed under the group of like physical objects. The sensors 240 can detect a set of attributes associated with the group of set of like physical objects. The sensors 240 can encode data indicative of the attributes in communication signals and transmit the communication signals to the computing system 200. The control engine 220 can decode the data indicative of the attributes from the communication signals and confirm whether the quantity of the group of like physical objects is below a specified threshold amount based on the attributes.

As a non-limiting example, the automated shelf sensing system 250 can be implemented in a retail store. In exemplary embodiments, a handheld device 265 can be mechanically coupled with a docking station mounted on a shelf. The handheld device 265 can belong to a store associate and products for sale can be disposed on the shelf. In response to the handheld device being mechanically coupled to the docking station a controller can power an electric circuit between the handheld device and the plurality of sensors to selectively energize or de-energize the sensors 240 disposed on the shelf. In response to receiving power the sensors 240 can detect a set of attributes associated with the products for sale disposed on the shelf. The sensors 240 can encode data indicative of the attributes into communication signals and transmit the communication signals to the computing system 200. The computing system 200 can execute the control engine 220 in response to receiving the communication signals from the sensors 240. The communication signals 240 can also include the location of the sensors 240. The control engine 220 can decode the attributes and location of the sensors 240 from the communication signals. The control engine 220 can query the locations database 225 by using the location of the sensors 240 to determine the products disposed at the location of the sensors 240. The control engine 220 can query the physical objects database using the determined products at the locations of the sensors 240 to retrieve information associated with the products. The control engine 220 can compare the set of attributes detected by the sensors 240 and the retrieved set of information associated with the products. For example, perishable items can be disposed on the shelf and the sensors 240 can detect temperature and moisture of the perishable items. The sensors can encode data indicative of the temperature and moisture in communication signals and transmit the communication signals to the computing system 200. The control engine 220 can decode the detected temperature and moisture from the communication signals. The control engine 220 can query the physical objects database 230 to retrieve the ideal temperature and moisture level for the perishable items and compare the ideal temperature and moisture level to the detected temperature and moisture. The control engine 220 can determine that the perishable items may be damaged or decomposing based on the sensor data. The control engine 220 can trigger an action in response to determining that the perishable items may be damaged or decomposing. In some embodiments, the action can be updating the database and/or transmitting an alert. The control engine 220 can transmit an alert to the handheld device 265 docked at the docking station where a store associate can investigate further. Alternatively, the control engine 220 can transmit an alert to another handheld device of another store associate.

In some embodiments, the control engine 220 can instruct the handheld device 265 to de-energize or de-activate a portion of the sensors 240 disposed on the shelf. Alternatively, the control engine 220 can instruct the handheld device 265 to de-energize or de-activate all of the sensors 240 disposed on the shelf. The control engine 220 can determine based on records in the physical objects database 230 that inventory of a particular product is below a specified threshold amount. The control engine 220 can instruct the handheld device 265 to energize only the sensors 240 disposed under the group of like products. The sensors 240 can detect a set of attributes associated with the group of set of like products, such as quantity or weight. The sensors 240 can encode data indicative of the attributes in communication signals and transmit the communication signals to the computing system 200. The control engine 220 can decode the data indicative of the attributes from the communication signals and confirm whether the quantity of the group of like physical objects is below a specified threshold amount based on the attributes.

Figure 3:
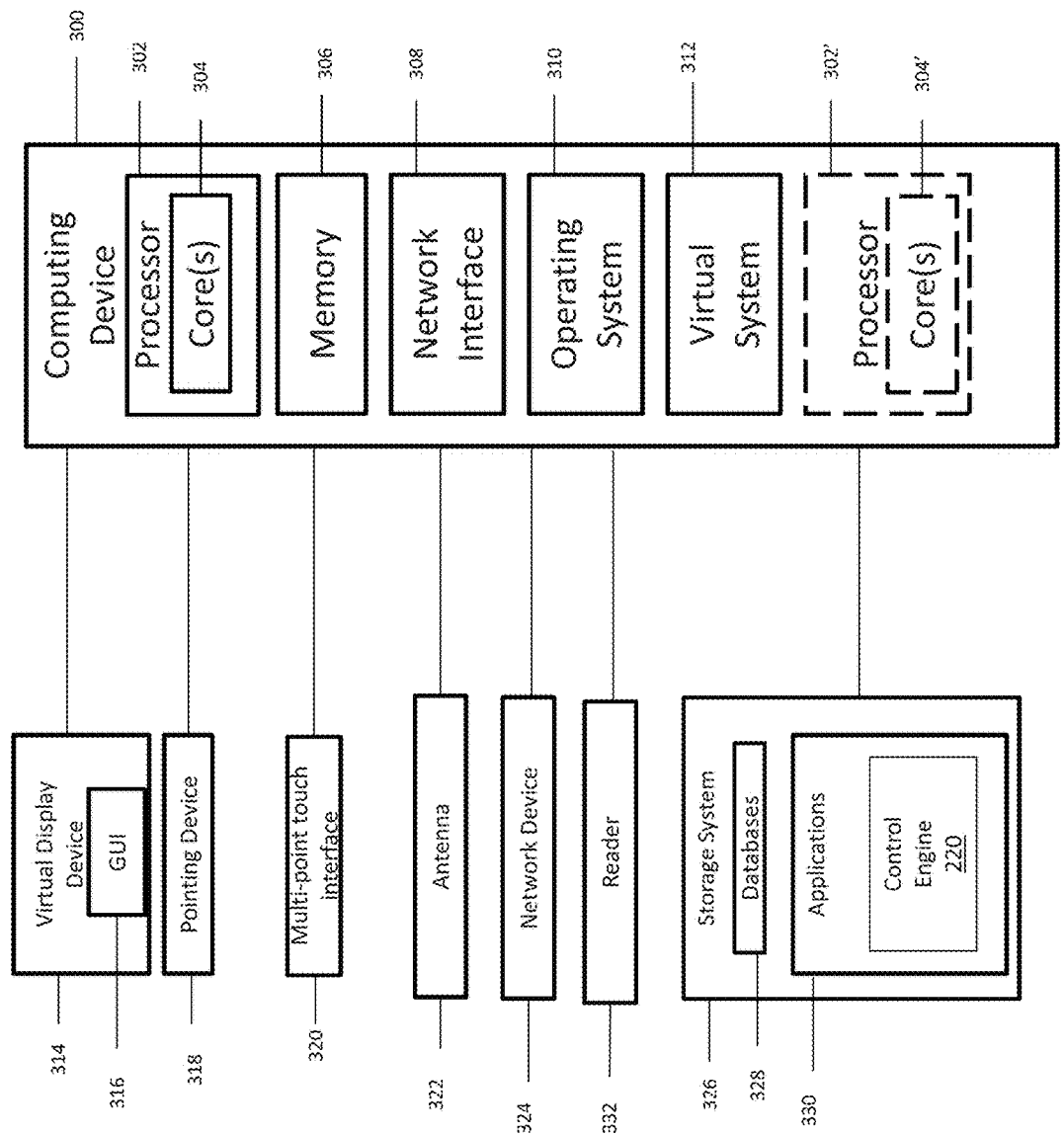
FIG. 3 illustrates an exemplary computing device in accordance with an exemplary embodiment.

FIG. 3 is a block diagram of an exemplary computing device suitable for implementing embodiments of the automated shelf sensing system. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof. The computing device 300 can receive data from input/output devices such as, a reader 332.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications such as the control engine 220). For example, exemplary storage device 326 can include one or more databases 328 for storing information regarding the physical objects. The databases 328 may be updated manually or automatically at any suitable time to add, delete, and/or update one or more data items in the databases. The databases 328 can include information associated with physical objects disposed in the facility and the locations of the physical objects.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
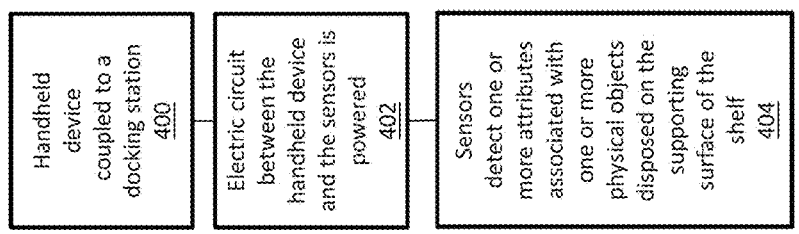
FIG. 4 is a flowchart illustrating a process of the automated shelf sensing system according to an exemplary embodiment.

FIG. 4 is a flowchart illustrating an exemplary process performed by the automated shelf sensing system according to an exemplary embodiment. In operation 400, a handheld device (e.g. handheld device 124 and 265 as shown in FIGS. 1B and 2) can be coupled to a docking station (e.g. docking station 126 as shown in FIG. 1B). The docking station can be mounted on a supporting surface (e.g. supporting surface 130 as shown in FIG. 1B) on of a shelf (e.g. shelf 104 and 120 as shown in FIG. 1A-B) for supporting one or more physical objects (e.g. physical objects 102 as shown in FIG. 1A). Sensors (e.g. sensors 122 and 240 as shown in FIGS. 1B and 2) can be disposed on, in, adjacent to, or in proximity of, the supporting surface of the shelf. In operation 402, an electric circuit between the handheld device and the sensors can be powered to selectively energize or de-energize the sensors in response to the docking station coupling with the handheld device. In operation 404, the sensors can detect one or more attributes associated with one or more physical objects disposed on the supporting surface of the shelf.

Figure 5:
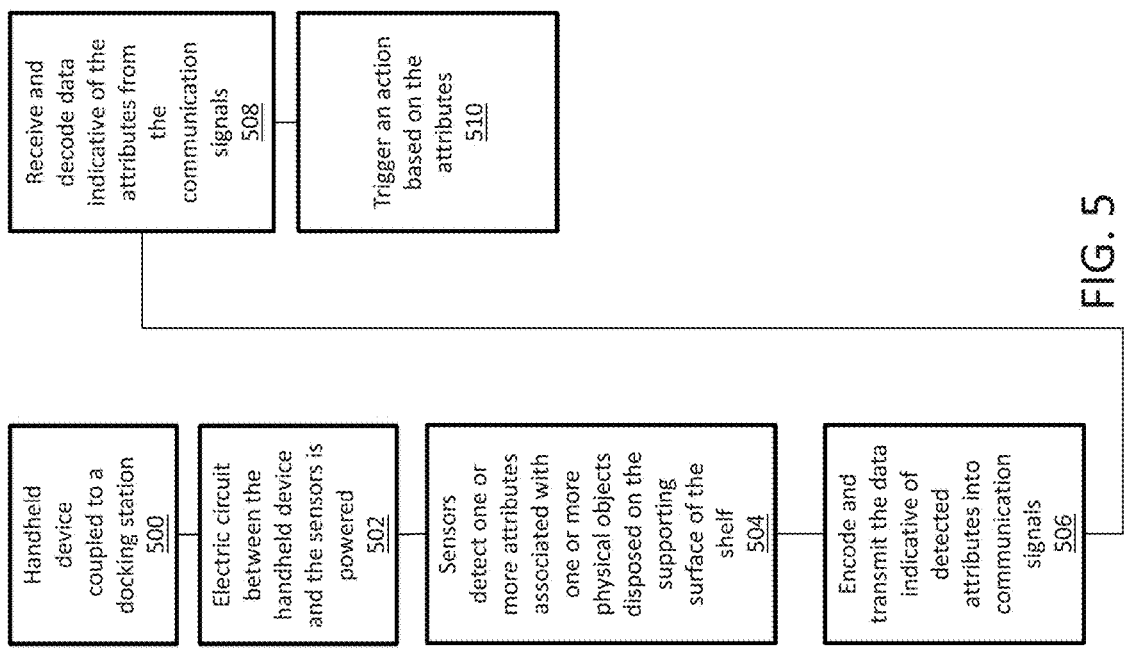
FIG. 5 is a flowchart illustrating a process of the automated shelf sensing system according to an exemplary embodiment.

FIG. 5 is a flowchart illustrating an exemplary process performed by the automated shelf sensing system according to an exemplary embodiment. In operation 500, a handheld device (e.g. handheld device 124 and 265 as shown in FIGS. 1B and 2) can be coupled to a docking station (e.g. docking station 126 as shown in FIG. 1B). The docking station can be mounted on a supporting surface (e.g. supporting surface 130 as shown in FIG. 1B) on of a shelf (e.g. shelf 104 and 120 as shown in FIG. 1A-B) for supporting one or more physical objects (e.g. physical objects 102 as shown in FIG. 1A). Sensors (e.g. sensors 122 and 240 as shown in FIGS. 1B and 2) can be disposed on, in, adjacent to, or in proximity of, the supporting surface of the shelf. In operation 502, an electric circuit between the handheld device and the sensors can be powered to selectively energize or de-energize the sensors in response to the docking station coupling with the handheld device. In operation 504, the sensors can detect one or more attributes associated with one or more physical objects disposed on the supporting surface of the shelf. In operation 506, the sensors can encode data indicative of the detected attributes into communication signals and transmit the communication signals to a computing system (e.g. computing system 200 as shown in FIG. 2). In operation, 508, the computing system can receive and decode the data indicative of the attributes from the communication signals. In operation 510, the computing system can trigger an action based on the attributes.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An automated sensing system, the system comprising:
   a shelf including a supporting surface for supporting one or more physical objects;
   a plurality of sensors disposed in or about the supporting surface of the shelf, the plurality of sensors configured to detect one or more attributes associated with the one or more physical objects;
   a docking station disposed on, in, or about the supporting surface of the shelf and electrically coupled to the plurality of sensors, the docking station configured to couple to a handheld device, and
   a controller configured to power an electric circuit between the handheld device and the plurality of sensors to selectively energize or de-energize the plurality of sensors in response to coupling the handheld device within the docking station.

2. The system of claim 1, wherein the docking station includes an electrical connector.

3. The system of claim 2, further comprising the handheld device, wherein the handheld device includes a power source and handheld device is coupled with the docking station by mechanically coupling the power source of the handheld device and the electrical connector of the docking station.

4. The system of claim 3, wherein the power source of the handheld device provides electrical power to the plurality of sensors through the docking station and the electric circuit.

5. The system of claim 4, wherein the plurality of sensors are configured to:
   detect the one or more attributes in response to receiving electrical power, encode data associated with one or more attributes into communication signals, and
   transmit the communication signals.

6. The system of claim 5, further comprising:
   a computing system including a database that is communicatively coupled to the plurality of sensors, the computing system configured to:
   receive the communication signals from the plurality of sensors;
   decode the data associated with the one or more attributes from the communication signals; and
   trigger an action in response to receiving the data associated with the one or more attributes.

7. The system of claim 1, wherein the action is one or more of updating the database and transmitting an alert.

8. The system of claim 1, wherein the one or more attributes includes one or more of weight, temperature, moisture and quantity.

9. The system of claim 1, wherein the plurality of sensors are piezoelectric sensors.

10. The system of claim 1 wherein the controller is an addressable hardware controller.

11. The system of claim 1 wherein the controller is a software-based controller executing on the handheld device.

12. An automated sensing method, the method comprising:
    providing a shelf including a supporting surface for supporting one or more physical objects, a docking station and a plurality of sensors disposed on, in or about the supporting surface of the shelf, the docking station electrically coupled to the plurality of sensors;
    coupling the handheld device, with the docking station;
    powering an electrical circuit between the handheld device and the plurality of sensors to selectively energize or de-energize the plurality of sensors in response to the docking station coupling with the handheld device; and
    detecting, via the plurality of sensors, one or more attributes associated with one or more physical objects disposed on the supporting surface of the shelf.

13. The method of claim 12, wherein the docking station includes an electrical connector.

14. The method of claim 13, wherein the handheld device includes a power source and handheld device is coupled with the docking station by mechanically coupling the power source of the handheld device and the electrical connector of the docking station.

15. The method of claim 14, wherein the power source of the handheld device provides electrical power to the plurality of sensors through the docking station and the electric circuit.

16. The method of claim 15, further comprising:
    encoding, via the plurality of sensors, data associated with the one or more attributes into communication signals; and transmitting, via the plurality of sensors, the communication signals.

17. The method of claim 16, further comprising:
receiving the communication signals via a computing system that includes a database and is communicatively coupled to the plurality of sensors;
decoding the data from the communication signals via the computing system;
triggering an action in response to receiving the data associated with the one or more attributes.

18. The method of claim 17, wherein the action is one or more of:
updating the database; and
transmitting an alert.

19. The method of claim 12, wherein the set of attributes include one or more of a weight, a temperature, a moisture level and a quantity.

20. An automated sensing system, the system comprising:
a handheld device that includes a display and is configured to execute a sensing application;
a shelf including a supporting surface for supporting one or more physical objects;
a plurality of sensors disposed on, in or about the supporting surface of the shelf, the plurality of sensors configured to detect one or more attributes associated with the one or more physical objects, encode data associated with one or more attributes into communication signals and transmit the communication signals;
a docking station disposed in or about the supporting surface of the shelf and electrically coupled to the plurality of sensors, the docking station configured to couple to the handheld device, an electric circuit between the handheld device and the plurality of sensors powered in response to coupling the handheld device within the docking station, the electric circuit selectively energizing or de-energizing the plurality of sensors; and
a computing system including a database that is communicatively coupled to the plurality of sensors and the handheld device, the computing system configured to:
receive the communication signals from the plurality of sensors;
decode the data associated with the one or more attributes from the communication signals; and
transmit instructions associated with the one or more physical objects to the sensing application on the handheld device.

21. The system of claim 19 wherein the sensing application controls the display of the handheld device to display the instructions.

22. The system of claim 19 wherein the instructions cause the sensing application to request additional data from a selected sensor in the plurality of sensors.

23. The system of claim 19, wherein the docking station includes an electrical connector, the handheld device includes a power source and the handheld device is coupled with the docking station by mechanically coupling the power source of the handheld device and the electrical connector of the docking station.

24. The system of claim 22, wherein the handheld device further comprises a power source, and wherein the power source of the handheld device provides electrical power to the plurality of sensors through the docking station and wherein the plurality of sensors are configured to detect the one or more attributes in response to receiving electrical power.

* * * * *